United States Patent
Atsusaka et al.

(10) Patent No.: US 11,541,645 B2
(45) Date of Patent: Jan. 3, 2023

(54) COVER FILM

(71) Applicant: DENKA COMPANY LIMITED, Tokyo (JP)

(72) Inventors: Takanori Atsusaka, Isesaki (JP); Akira Sasaki, Isesaki (JP); Saori Niwa, Isesaki (JP); Shun Uchiyama, Isesaki (JP); Akihiro Yoshikawa, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 345 days.

(21) Appl. No.: 16/756,175

(22) PCT Filed: Oct. 29, 2018

(86) PCT No.: PCT/JP2018/040030
§ 371 (c)(1),
(2) Date: Apr. 15, 2020

(87) PCT Pub. No.: WO2019/087999
PCT Pub. Date: May 9, 2019

(65) Prior Publication Data
US 2020/0247099 A1    Aug. 6, 2020

(30) Foreign Application Priority Data
Oct. 31, 2017    (JP) .............................. JP2017-210000

(51) Int. Cl.
*B32B 27/30* (2006.01)
*B32B 5/30* (2006.01)
(Continued)

(52) U.S. Cl.
CPC .............. *B32B 27/308* (2013.01); *B32B 5/30* (2013.01); *B32B 7/12* (2013.01); *B32B 27/08* (2013.01);
(Continued)

(58) Field of Classification Search
None
See application file for complete search history.

(56) References Cited

U.S. PATENT DOCUMENTS

| 6,017,623 A | 1/2000 | Nakanishi |
| 2009/0092847 A1* | 4/2009 | Onoe .................. C09D 151/06 524/612 |
| 2013/0089746 A1 | 4/2013 | Sasaki et al. |

(Continued)

FOREIGN PATENT DOCUMENTS

| JP | H08-258888 A | 10/1996 |
| JP | H09-201922 A | 8/1997 |
| JP | H09-207988 A | 8/1997 |
| JP | H10-095448 A | 4/1998 |

(Continued)

OTHER PUBLICATIONS

Jan. 22, 2019 Search Report issued in International Patent Application No. PCT/JP2018/040030.

*Primary Examiner* — Alicia Chevalier
*Assistant Examiner* — Elaine M Vazquez
(74) *Attorney, Agent, or Firm* — Oliff PLC

(57) ABSTRACT

A cover film having at least (A) a substrate layer, (B) an intermediate layer, (C) an adhesive layer, and (D) a heat seal layer having a heat sealable resin, a thermoplastic resin of the (D) heat sealing layer having a mixture of two types of (meth)acrylic acid ester copolymers having different glass transition temperatures and a hydrazide compound, wherein one of the (meth)acrylic acid ester copolymer in the (meth) acrylic acid ester copolymer mixture has a glass transition temperature of −20 to 10° C. and the other (meth)acrylic acid ester copolymer has a glass transition temperature of 40 to 80° C.

8 Claims, 1 Drawing Sheet

(51) Int. Cl.
*B32B 7/12* (2006.01)
*B32B 27/08* (2006.01)
*B32B 27/18* (2006.01)
*C09J 9/02* (2006.01)
*C09J 7/30* (2018.01)

(52) U.S. Cl.
CPC ............... *B32B 27/18* (2013.01); *C09J 7/30* (2018.01); *C09J 9/02* (2013.01); *B32B 2264/108* (2013.01); *B32B 2307/202* (2013.01); *B32B 2307/31* (2013.01); *B32B 2439/40* (2013.01); *Y10T 428/2817* (2015.01); *Y10T 428/2826* (2015.01)

(56) References Cited

U.S. PATENT DOCUMENTS

| | | | | |
|---|---|---|---|---|
| 2014/0170414 | A1* | 6/2014 | Zhang | ........................ C09J 7/29 428/335 |
| 2016/0145465 | A1 | 5/2016 | Furutaka et al. | |

FOREIGN PATENT DOCUMENTS

| | | | |
|---|---|---|---|
| JP | 2006-219137 | A | 8/2006 |
| JP | 2015-199535 | A | 11/2015 |
| JP | 5983902 | B1 | 9/2016 |
| JP | 2016-210503 | A | 12/2016 |
| JP | 2016-216060 | A | 12/2016 |
| WO | 2011/158550 | A1 | 12/2011 |
| WO | 2014/203853 | A1 | 12/2014 |
| WO | 2015/029867 | A1 | 3/2015 |
| WO | 2016/024529 | A1 | 2/2016 |

* cited by examiner

NOTE: R INDICATES A CARBON CHAIN

COVER FILM

TECHNICAL FIELD

The present invention pertains to a cover film used in packages for electronic components.

BACKGROUND ART

Alongside the miniaturization of electronic components, the miniaturization and performance of the electronic components used have also continued to improve and components are automatically mounted on printed circuit boards in assembly processes for electronic devices. Surface-mounted electronic components are stored in carrier tape in which pockets that are thermoformed in accordance with the shapes of the electronic components so as to be able to store the same are continuously formed. After the electronic components are stored, a cover film is laid as a lid material on an upper surface of the carrier tape and both edges of the cover film are continuously heat-sealed in the longitudinal direction with a heated seal bar to form a package. Materials such as those in which a biaxially stretched polyester film is laminated onto a substrate and a thermoplastic resin heat seal layer is laminated thereon are used as cover film materials. Materials made from thermoplastic resins such as polystyrene or polycarbonates are mainly used as the carrier tape.

In recent years, various electronic components such as capacitors, resistors, ICs, LEDs, connectors, and switching elements have become remarkably small, lightweight, and thin and the required performance when peeling a cover film in order to extract a stored electronic component from a package has become stricter than was conventional. Electronic components transported, etc. by means of the carrier tape package have attained higher performance and have miniaturized alongside wide-ranging improvements in surface-mounting techniques in recent years. Static electricity is generated by such electronic components rubbing against the inner surfaces of an embossed carrier tape or inner surfaces of the cover film due to vibration during transport of carrier tape packages and the electronic components may be damaged thereby. Further, there are cases of similar situations occurring due to static electricity generated when peeling a cover film from a carrier tape, etc. Accordingly, measures against static electricity for carrier tapes and cover tapes have been the most critical problems.

In a state in which electronic components are stored in a package, the presence or absence of the components, the storage orientation of the components, damage or bending of leads, etc. may be inspected. Alongside the miniaturization of electronic components in recent years, extremely high transparency in cover films is necessary for the inspection of components stored in packages. Furthermore, friction generated between an electronic component and the heat seal layer of the cover film immediately following heat sealing or in a transportation environment also can inhibit inspection due to the heat seal surface whitening and, in addition to the abovementioned transparency, suppression of scraping of the heat seal surface is also demanded.

As measures against scraping of heat seal surfaces, in addition to methods for causing microparticles to protrude from the surface of a heat seal layer by adding 0.1 to 50% by mass of silica particles to an EVA-based heat seal layer so the thermoplastic resin and the component do not touch and adding electrically conductive microparticles such as tin oxide or zinc oxide to a heat seal layer, there is also the example of setting the surface roughness Rz of a heat seal surface to at least 1.0 μm (see Patent Documents 1 to 6). However, even if such methods can suppress scraping of a heat seal surface of a cover film due to friction with electronic components, there are cases in which transparency falls remarkably and the demanded performance cannot be satisfied and scraping of a heat seal surface of a cover film due to friction with conventional electronic components was not considered as a problem.

CITATION LIST

Patent Literature

Patent Document 1: JP H9-207988 A
Patent Document 2: JP H9-201922 A
Patent Document 3: JP H10-95448 A
Patent Document 4: JP 2006-219137 A
Patent Document 5: JP H8-258888 A
Patent Document 6: JP 5983902 B

SUMMARY OF INVENTION

Technical Problem

The present invention addresses the problem of providing a cover film for a polystyrene, polycarbonate, etc. carrier tape wherein the peeling strength when peeling the cover film in order to extract an electronic component is continuously within a predetermined range, increases in peeling strength are small even during rapid peeling, trouble during the mounting process such as minute electronic components protruding due to vibration when peeling or breakage of the cover film during rapid peeling does not occur, the cover film is highly transparent, and whitening due to friction with the electronic component does not occur.

Solution to Problem

As a result of diligent investigation of the abovementioned problem, the inventors, etc. discovered that a cover film that overcomes the problem of the present invention is obtained by providing a heat seal layer comprising a thermoplastic resin having a specific composition and arrived at the present invention.

That is, the present invention is a cover film comprising at least (A) a substrate layer, (B) an intermediate layer, (C) an adhesive layer, and (D) a heat seal layer having a thermoplastic resin that is heat sealable to a carrier tape, the thermoplastic resin constituting the (D) heat seal layer comprising a mixture of two types of (meth)acrylic acid ester copolymers with different glass transition temperatures and a hydrazide compound. The glass transition temperature of one of the (meth)acrylic acid ester copolymer in the (meth)acrylic acid ester copolymer mixture is preferably from −20 to 10° C., more preferably from −20 to 0° C., and still more preferably from −10 to 0° C. Further, the glass transition temperature of the other (meth)acrylic acid ester copolymer is preferably from 40 to 80° C., more preferably from 40 to 70°, and still more preferably from 50 to 70°. Moreover, it is preferable that there are 100 to 400 parts by mass of the (meth)acrylic acid ester copolymer with the higher glass transition temperature with respect to 100 parts by mass of the (meth)acrylic acid ester copolymer with the lower glass transition temperature and that there are 1 to 3 parts by mass of the hydrazide compound with respect to 100 parts by mass of the (meth) acrylic acid ester copolymer with the lower glass transition temperature.

It is preferable that the carbon chain in the hydrazide compound included in the (meth)acrylic acid ester copolymers that form the (D) heat seal layer has 1 to 4 carbon atoms.

It is preferable that the (B) intermediate layer is formed from a polyolefin-based resin and the (C) adhesive layer is formed from: a resin composition containing a styrene-based resin having a styrene-diene block copolymer as a main component and an ethylene-α-olefin random copolymer; a hydrogenate of an aromatic vinyl-conjugated diene copolymer comprising 15 to 35% by mass of a monomer unit derived from an aromatic vinyl compound; or an ethylene-vinyl acetate copolymer comprising 75 to 91% by mass of a monomer unit derived from ethylene.

It is preferable that the (D) heat seal layer contains an electrically conductive material and further, that the shape of the electrically conductive material comprises either needle-shaped or spheroidal microparticles or a combination thereof. Carbon nanomaterials are preferable as other embodiments of the electrically conductive material.

Meanwhile, the present invention encompasses an electronic component package using the cover film as a lid material of a carrier tape that comprises a thermoplastic resin.

Advantageous Effects of Invention

In the present invention, a cover film for a polystyrene, polycarbonate, etc. carrier tape wherein the peeling strength when peeling the cover film in order to extract an electronic component is continuously within a predetermined range, trouble during the mounting process such as minute electronic components protruding due to vibration when peeling does not occur, the cover film is highly transparent, and whitening due to friction with the electronic component does not occur is obtained.

DESCRIPTION OF EMBODIMENTS

Figure 1:
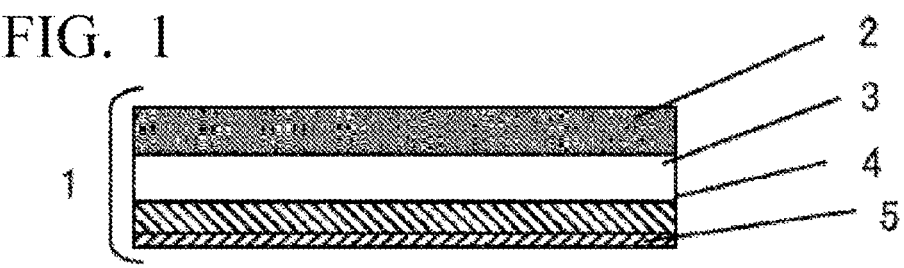
FIG. 1 A cross-sectional view showing one example of the layer configuration of the cover film of the present invention.

The cover film of the present invention comprises at least (A) a substrate layer, (B) an intermediate layer, (C) an adhesive layer, and (D) a heat seal layer. The configuration of one example the cover film of the present invention is shown in FIG. 1. The (A) substrate layer is a layer comprising a biaxially stretched polyester or a biaxially stretched nylon and biaxially stretched polyethylene terephthalate (PET), biaxially stretched ethylene naphthalate (PEN), and biaxially stretched 6,6 nylon or 6-nylon can particularly suitably be used. In addition to materials normally used as biaxially stretched PET, biaxially stretched PEN, and biaxially stretched 6,6-nylon or 6-nylon, those to which an antistatic agent has been applied or into which an antistatic agent has been kneaded for an antistatic treatment or those to which a corona treatment, an adhesion-facilitating treatment, etc. has been performed can be used. If the substrate layer is too thin, the tensile strength of the cover film itself decreases and "film breakage" therefore readily occurs when peeling the cover film. Conversely, if the substrate layer is too thick, this not only invites decreases in heat sealing to the carrier tape, but rises in costs, so normally, a substrate layer with a thickness of 12 to 25 μm can suitably be used.

In the present invention, the (B) intermediate layer can be provided by laminating the same to one side of the (A) substrate layer via an anchor coat layer. Linear low-density polyethylene (hereafter indicated as LLDPE), which has particular flexibility and appropriate stiffness and has excellent tear strength at room temperature, can suitably be used as the resin constituting the (B) intermediate layer and, by using a resin having a density in the range of 0.880 to 0.925 ($\times 10^3$ kg/m$^3$) in particular, not only does staining of the iron when heat sealing not readily occur due to protrusion of the intermediate resin layer from the end of the cover film not readily occurring due to heat or pressure when heat sealing, but a stable peeling strength when peeling the cover film is easily obtained because uneven contact with the heat seal iron is mitigated due to the intermediate layer softening when heat sealing the cover film.

In LLDPEs there are those polymerized by a Ziegler type catalyst and those catalyzed by metallocene-based catalysts (hereafter indicated as m-LLDPE). The molecular weight distribution of m-LLDPEs is narrowly controlled and they therefore have a particularly high tear strength and an m-LLDPE, in particular, is preferably used as the (B) intermediate layer of the present invention.

The m-LLDPE is a copolymer of ethylene and an olefin having a carbon number of at least 3 as a comonomer, preferably a linear or branched aromatic core-substituted α-olefin with a carbon number of 3 to 18. For example, propylene, 1-butene, 1-pentene, 1-hexene, 1-octene, 1-nonene, 1-decene, 1-dodecene, 1-tetradecene, 1-hexadecene, 1-octadecene, etc. are raised as linear monoolefins. Further, for example, 3-methyl-1-butene, 3-methyl-1-pentene, 4-methyl-1-pentene, 2-ethyl-1-hexene, etc. can be raised as branched monoolefins. Moreover, styrene, etc. are raised as examples of aromatic core-substituted monoolefins. These comonomers can be copolymerized with ethylene alone or in a combination of two or more. In this copolymerization, copolymerization with a polyene such as butadiene, isoprene, 1,3-hexadiene, dicyclopentadiene, or 5-ethylidine-2-norbornene may be performed.

The thickness of the (B) intermediate layer is generally 5 to 50 μm and is preferably 10 to 40 μm. With a thickness of the (B) intermediate layer of less than 5 μm, the effect of easing uneven contact of the heat seal iron when heat sealing the cover film to the carrier tape is not readily obtained. Meanwhile, if a thickness of 50 μm is exceeded, sufficient peeling strength becoming difficult to obtain may occur when heat sealing the cover film to the carrier tape due to the total thickness of the cover film.

In the cover film of the present application, the (C) adhesive layer is provided between the (B) intermediate layer and the (D) heat seal layer. The thermoplastic resin used in the (C) adhesive layer comprises any of: a resin composition containing a styrene-based resin having a styrene-diene block copolymer as a main component and an ethylene-α-olefin random copolymer; a hydrogenate of an aromatic vinyl-conjugated diene copolymer in which the content of aromatic vinyl groups is 15 to 35% by mass; and an ethylene-vinyl acetate copolymer comprising 75 to 91% by mass of an olefin component, or a combination thereof. Among these, a hydrogenate of a styrene-isoprene copolymer or a hydrogenate of a styrene-butadiene copolymer resin comprising a styrene ratio of 15 to 35% by mass has little variation in peeling strength when peeling the cover film and can be suitably used.

The thickness of the (C) adhesive layer is normally in the range of 0.1 to 15 μm and preferably in the range of 0.1 to 10 μm. When the thickness of the (C) adhesive layer is less than 0.1 μm, sufficient peeling strength may not be demonstrated when the cover film is heat sealed to the carrier tape. Meanwhile, in cases in which the thickness of the (C) adhesive layer exceeds 15 μm, there is the risk of variance in peeling strength when peeling the cover film arising. The (C) adhesive layer is normally formed by extrusion film formation, but in cases in which the layer has been formed by a coating method, the thickness stated here is the post-drying thickness.

In order to prevent blocking when winding the cover film, spheroidal or milled organic particles such as acrylic particles, styrene-based particles, or silicone-based particles or inorganic particles such as talc particles, silica particles, mica particles, calcium oxide, or magnesium oxide can be added to the (C) adhesive layer. In particular, decreases in transparency are small when acrylic particles or silica particles are added and these can more suitably be used. The mode diameter obtained from a mass distribution curve of the particles is preferably 1 to 10 μm and still more preferably 2 to 7 μm. If the mode diameter is less than 1 μm, the blocking prevention effect due to the particle addition may not sufficiently manifest. Meanwhile, in cases in which the mode diameter exceeds 10 μm, the blocking prevention effect becomes favorable, but the necessity of adding a large amount to prevent blocking invites rises in costs and because visible irregularities arise on the heat seal layer surface of the cover film, there is the risk of the external appearance of the cover film being impaired. The mass fraction of the microparticles of the (C) adhesive layer is preferably 0 to 15% by mass and still more preferably 5 to 10% by mass. In this range, the amount added is balanced between transparency, heat sealing, and blocking prevention effects.

In the cover film of the present application, the (D) heat seal layer is formed on a surface of the (C) adhesive layer. The thermoplastic resin of the (D) heat seal layer is (meth) acrylic acid ester copolymers. The (meth)acrylic acid ester copolymers are resins comprising one or more of an acrylic acid ester such as methyl acrylate, ethyl acrylate, propyl acrylate, or butyl acrylate, a methacrylic acid ester such as methyl methacrylate, ethyl methacrylate, propyl methacrylate, butyl methacrylate, cyclohexyl methacrylate, etc. and may be a resin in which two or more of these have been copolymerized.

The (meth)acrylic acid ester copolymers constituting the (D) heat seal layer comprise two types of (meth)acrylic acid ester copolymers with different glass transition temperatures. The glass transition temperature of one is preferably −20 to 10° C. and more preferably −10 to 0° C. When the glass transition temperature is lower than −20° C., there is the risk of variation in the peeling strength when peeling the cover film arising and furthermore, defects in which an electronic component stored within a carrier tape adheres to the (D) heat seal layer of the cover tape or whitening occurring due to friction with the electronic component may occur. Meanwhile, in cases in which the glass transition temperature exceeds 10° C., elasticity of the (meth)acrylic acid ester copolymers that constitute the heat seal layer is not obtained and there is the possibility that whitening will occur due to friction with the electronic component.

The glass transition temperature of the other (meth)acrylic acid ester copolymer is preferably 40 to 80° C. and more preferably 50 to 70° C. At less than 40° C., the elasticity of the (D) heat seal layer decreases and, as stated previously, whitening due to friction with an electronic component may occur. Meanwhile, when the glass transition temperature exceeds 80° C., film formation of the (D) heat seal layer is not stable and whitening due to friction with an electronic component may occur.

The glass transition temperatures are determined by differential scanning calorimetry (DSC). An input compensation-type DSC8500 manufactured by PerkinElmer Japan, Co., Ltd. was used as the device and, sealed with nitrogen gas, a sample amount of 5 mg of the (meth)acrylic acid ester copolymers was placed in an aluminum pan, rapidly cooled to −40° C., and data was obtained at a temperature elevation rate of 10 degrees per minute and an interval of 0.01 seconds. The intersection of a baseline and the tangent at the inflection point changing to the heat-absorption side as the temperature rises is read as and determined to be the glass transition point.

The mixing ratio of the two types of (meth)acrylic acid ester copolymers is preferably 100 to 400 parts by mass of the (meth)acrylic acid ester copolymer with the higher glass transition temperature with respect to 100 parts by mass of the (meth)acrylic acid ester copolymer with the lower glass transition temperature. If there are fewer than 100 parts by mass, elasticity of the heat seal layer decreases and, as stated previously, whitening due to friction with an electronic component may occur. Meanwhile, in cases in which there are greater than 400 parts by mass, film formation of the (D) heat seal layer is unstable and whitening due to friction with an electronic component may occur.

Figure 2:
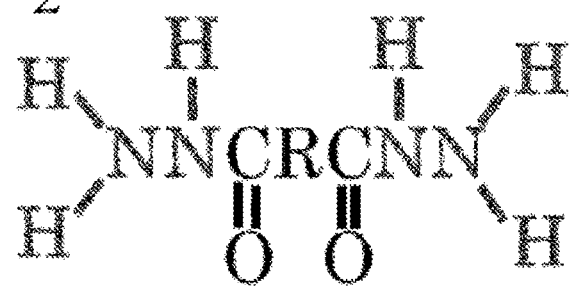
FIG. 2 A structural formula showing one example of the dihydrazide compound used in the present invention.

A hydrazide compound is mixed with the (D) heat seal layer. The hydrazide compound is generally a monohydrazide or a dihydrazide compound, but from the objective of cross-linking the (meth)acrylic acid ester copolymers to one another, the dihydrazide compound shown in FIG. 2 is preferred. Among dihydrazide compounds, there are malonic acid dihydrazide in which the carbon chain is equivalent to C1 (the carbon chain shows 1), C2-equivalent succinic acid dihydrazide, C3-equivalent glutaric acid dihydrazide, C4-equivalent adipic acid dihydrazide, and C8-equivalent sebacic acid dihydrazide.

The carbon chain constituting the hydrazide compound is preferably a C1 to 4 carbon chain. In cases in which C4 is exceeded, the compound is poor in reactivity and there is the risk of sufficient elasticity of the heat seal layer not being obtained and whitening due to friction with an electronic component may occur.

The mixing ratio of the hydrazide compound constituting the (D) heat seal layer is preferably 1 to 3 parts by mass with respect to 100 parts by mass of the (meth)acrylic acid ester copolymer with the lower glass transition temperature. If there is less than 1 part by mass, reaction with the (meth) acrylic acid ester copolymers does not sufficiently progress and there is the risk of whitening occurring due to friction with an electronic component. Meanwhile, if there are greater than 3 parts by mass, the elasticity of the (D) heat seal layer becomes high and there is the possibility of variance in the peeling strength when peeling the cover film arising.

The (D) heat seal layer can contain at least one selected from electrically conductive tin oxide particles, electrically conductive zinc oxide particles, or electrically conductive titanium oxide particles. Among these, electrical conductivity is increased by using tin oxide doped with antimony, phosphorus, or gallium and there are minimal transparency decreases, so these can more suitably be used. Particles having a spheroidal or needle shape can be used as the electrically conductive tin oxide particles, electrically conductive zinc oxide particles, or the electrically conductive titanium oxide particles. In cases in which needle-shaped tin oxide particles doped with antimony are used, in particular, a cover film having especially favorable antistatic performance is obtained. The amount added is normally 100 to 1,000 parts by mass with respect to 100 parts by mass of the thermoplastic resin constituting the (D) heat seal layer and is preferably 200 to 800 parts by mass. In cases in which the amount of the electrically conductive particles added is less than 100 parts by mass, there is the risk of a cover film in which the surface resistivity value of the (D) heat seal layer side is no greater than $10^{12}\Omega$ not being obtained and if the amount exceeds 1,000 parts by mass, the relative amount of the thermoplastic resin falls and therefore there is the risk that sufficient peeling strength due to the heat seal will become difficult to obtain.

The (D) heat seal layer can contain at least one carbon nanomaterial of carbon nanotubes and carbon nanofibers. Among these, carbon nanotubes with an aspect ratio of 10 to 10,000 are preferable. The amount added to the (D) heat seal layer is 0.5 to 15 parts by mass with respect to 100 parts by mass of the thermoplastic resin constituting the layer and preferably 3 to 10 parts by mass. In cases in which the amount added is less than 0.5 parts by mass, the effect of imparting electrical conductivity by addition of the carbon nanomaterial is not sufficiently obtained, whereas, if the amount exceeds 15 parts by mass, not only does this invite rises in costs, but also decreases in the transparency of the cover film, so inspection of a stored component through the cover film becomes difficult.

The thickness of the (D) heat seal layer is in the range of 0.1 to 5 µm, preferably 0.1 to 3 µm, and still more preferably 0.1 to 0.5 µm. When the thickness of the heat seal layer is less than 0.1 µm, the (D) heat seal layer may not demonstrate sufficient peeling strength. Meanwhile, in cases in which the thickness of the heat seal layer exceeds 5 µm, this invites not only rises in costs, but variance in the peeling strength when peeling the cover film also readily arises.

The method for fabricating the cover film is not particularly limited and any general method can be used. For example, a two-layer film comprising (A) a substrate layer and (B) an intermediate layer is configured by applying an adhesive such as a polyurethane, polyester, polyolefin, or polyethyleneimine to a biaxially stretched polyester film surface of the (A) substrate layer, extruding a resin composition having an m-LLDPE as a main component that serves as the (B) intermediate layer from a T-die, and coating a surface to which an anchor coating agent has been applied with the same. Furthermore, the surface of the (B) intermediate layer can be coated with the (C) adhesive layer of the present invention by, for example, a gravure coater, a reverse coater, a kiss coater, an air knife coater, a Mayer bar coater, a dip coater, etc. In this case, it is preferable that a corona treatment or ozone treatment is performed on the (B) intermediate layer surface before applying and performing a corona treatment is particularly preferable. Furthermore, the objective cover film can be obtained by coating the (C) adhesive layer applied to the (B) intermediate layer with a resin composition constituting the (D) heat seal layer with a gravure coater, a reverse coater, a kiss coater, an air knife coater, a Mayer bar coater, a dip coater, etc.

As another method, a film comprising the (A) substrate layer biaxially stretched polyester film, the (B) intermediate layer, and the (C) adhesive layer can be obtained by film-forming the (B) intermediate layer and (C) the adhesive layer ahead of time with a T-die casting method, an inflation method, etc. and a dry lamination method that adheres each film to the biaxially stretched polyester film of the (A) substrate layer via an adhesive such as a polyurethane, polyester, or polyolefin and the objective cover film can also be obtained by applying the (D) heat seal layer to the surface of the (C) adhesive layer.

As yet another method, the objective cover film can also be obtained by a sandwich lamination method. That is, the film constituting the (C) adhesive layer is film-formed with a T-die casting method, an inflation method, etc. Then, the objective film can be obtained by supplying a resin composition having a molten m-LLDPE as a main component between the (C) adhesive layer film and the (A) substrate layer film to form the (B) intermediate layer and laminating, obtaining a film comprising the (A) substrate layer, (B) intermediate layer, and (C) adhesive layer of the objective cover film, and further applying the (D) heat seal layer to the adhesive layer-side surface thereof. In the case of this method, similar to the abovementioned methods, using a film in which the surface of the side of the (A) substrate layer to be laminated is coated with an adhesive is common.

In addition to the abovementioned steps, an antistatic treatment can be performed on the (A) substrate layer of the cover film, as necessary. For example, an anionic, cationic, non-ionic, betaine-based, etc. surfactant-type antistatic agent, an electrically conductive material in which a polymer-type antistatic agent and a binder have been dispersed, etc. can be applied as the antistatic agent with a roll coater using a gravure roll, a lip coater, spraying, etc. Further, in order to uniformly apply these antistatic agents, a corona discharge treatment or an ozone treatment is preferably performed on the film surface before the antistatic treatment and a corona discharge treatment is particularly preferred.

The cover film is used as a lid material of a carrier tape, which is a storage container for electronic components. A carrier tape is a belt-like article with a width from about 8 mm to 100 mm having pockets for storing electronic components. In cases in which the cover film is heat sealed as a lid material, the material constituting the carrier tape is not particularly limited and commercially available materials can be used, for example, polystyrene, polyesters, polycarbonates, polyvinyl chlorides, etc. can be used. In cases in which an acrylic resin is used as the heat seal layer, the cover film is suitably used in combination with a polystyrene and/or polycarbonate carrier tape. Materials to which electrical conductivity has been imparted by kneading carbon black or carbon nanotubes in a resin, materials in which an antistatic agent or electrically conductive filler has been kneaded, or materials of which the surface has been coated with a surfactant-type antistatic agent or a coating liquid in which an electrically conductive substance such as polypyrrole or polythiophene is dispersed in an organic binder such as acryl and antistatic properties imparted can be used as the carrier tape.

Packages in which electronic components have been stored are obtained by, for example, making a cover film into a lid material after storing an electronic component, etc. in an electronic component storage part of a carrier tape, packaging by continuously heat sealing both edges of the cover film in the longitudinal direction thereof, and winding on a reel. Electronic components, etc. can be stored and transported by packaging in this form. While transporting a package in which electronic components, etc. have been stored using holes, called sprocket holes, for carrier tape transport that are provided on the edges of the carrier tape in the longitudinal direction thereof, the cover film is intermittently peeled and the presence, orientation, and position of the electronic components, etc. are confirmed while these are extracted by a component mounting device and mounted on substrates.

Furthermore, when the cover film is peeled, if the peeling strength is too little, there is the risk of peeling completely from the carrier tape and the stored components falling out and if the peeling strength is too great, there is the risk of peeling from the carrier tape becoming difficult and also that breakage will occur when peeling the cover film, so when heat sealed at 120 to 220° C., a cover film having a peeling strength of 0.05 to 1.0 N is good and it is preferable that variation in the peeling strength is below 0.4 N.

EXAMPLES

The present invention shall be explained in detail below using examples, but the present invention is not limited thereby. In the examples and comparative examples, the following resin raw materials are used in the (A) substrate layer, (B) intermediate layer, (C) adhesive layer, and (D) heat seal layer.
((A) Substrate Layer Resin)
(a-1) Substrate: E-5100 (manufactured by TOYOBO CO., LTD.), biaxially stretched polyethylene terephthalate film, thickness: 16 μm
((B) Intermediate Layer Resin)
(b-1) m-LLDPE: Umerit 2040F (manufactured by UBE-MARUZEN POLYETHYLENE), MFR: 4.0 g/10 min (measurement temperature: 190° C., load: 2.16 kgf), density: $0.904 \times 10^3$ kg/m$^3$
((C) Adhesive Layer Resin)
(c-1-1) Resin: Tuftec H1041 (manufactured by Asahi Kasei Chemicals Corporation), hydrogenated resin of a styrene-butadiene-styrene triblock copolymer (SEBS), content of monomer units derived from styrene (hereafter referred to as styrene component content): 30% by mass
(c-1-2) Resin: Denka Clearen (manufactured by Denka Company Limited), block copolymer comprising a styrene block-tapered block of styrene and butadiene-styrene block, styrene component content: 84% by mass
(c-1-3) Resin: TR Resin (manufactured by JSR Corporation), styrene-butadiene block copolymer, styrene component content: 43% by mass
(c-1-4) Resin: Tafmer-A (manufactured by Mitsui Chemicals, Inc.), ethylene-1-butene random copolymer
(c-1-5) Resin: Toyo Styrol E640N (manufactured by TOYO-STYRENE CO., LTD.), high-impact polystyrene
(c-1-6) Resin: Everflex V5711 (manufactured by DuPont-Mitsui Polychemicals Co. Ltd.), ethylene-vinyl acetate copolymer resin (EVA), content of monomer units derived from ethylene: 90% by mass
((C) Microparticles in the Adhesive Layer)
(c-2) Microparticles: PEX-ABT-16 (manufactured by TOKYO PRINTING INK MFG. CO., LTD.), talc and silica masterbatch (talc: 5% by mass, silica: 45% by mass, low-density polyethylene: 50% by mass)
((D) Heat Seal Layer Resin)
(d-1-1) Resin: NK Polymer EC-242 (manufactured by Shin-Nakamura Chemical Co., Ltd.), methyl methacrylate-butyl methacrylate-cyclohexyl methacrylate random copolymer emulsion, solid content concentration: 36% by mass, glass transition temperature: 60° C., does not contain a hydrazide compound
(d-1-2) Resin: NK Polymer EC-300 (manufactured by Shin-Nakamura Chemical Co., Ltd.), methyl methacrylate-butyl methacrylate-cyclohexyl methacrylate random copolymer emulsion, solid content concentration: 36% by mass, glass transition temperature: 0° C., 3 parts by mass of 4 carbon chain hydrazine compound content with respect to 100 parts by mass of acrylic resin
(d-1-3) Resin: NK Polymer EC-301 (manufactured by Shin-Nakamura Chemical Co., Ltd.), methyl methacrylate-butyl acrylate-cyclohexyl methacrylate random copolymer emulsion, solid content concentration: 36% by mass, glass transition temperature: −10° C., 1 part by mass of 4 carbon chain hydrazine compound content with respect to 100 parts by mass of acrylic resin
(d-1-4) Resin: NK Polymer EC-302 (manufactured by Shin-Nakamura Chemical Co., Ltd.), methyl methacrylate-butyl acrylate-cyclohexyl methacrylate random copolymer emulsion, solid content concentration: 36% by mass, glass transition temperature: −10° C., 3 parts by mass of 4 carbon chain hydrazine compound content with respect to 100 parts by mass of acrylic resin
(d-1-5) Resin: NK Polymer EC-303 (manufactured by Shin-Nakamura Chemical Co., Ltd.), methyl methacrylate-butyl acrylate-cyclohexyl methacrylate random copolymer emulsion, solid content concentration: 36% by mass, glass transition temperature: −10° C., 5 parts by mass of 4 carbon chain hydrazine compound content with respect to 100 parts by mass of acrylic resin
(d-1-6) Resin: NK Polymer EC-306 (manufactured by Shin-Nakamura Chemical Co., Ltd.), methyl methacrylate-butyl acrylate-cyclohexyl methacrylate random copolymer emulsion, solid content concentration: 36% by mass, glass transition temperature: −10° C., 3 parts by mass of 8 carbon chain hydrazine compound content with respect to 100 parts by mass of acrylic resin
(d-1-7) Resin: NK Polymer EC-307 (manufactured by Shin-Nakamura Chemical Co., Ltd.), methyl methacrylate-butyl acrylate-cyclohexyl methacrylate random copolymer emulsion, solid content concentration: 36% by mass, glass transition temperature: −10° C., 3 parts by mass of 1 carbon chain hydrazine compound content with respect to 100 parts by mass of acrylic resin
(d-1-8) Resin: NK Polymer EC-302NC (manufactured by Shin-Nakamura Chemical Co., Ltd.), methyl methacrylate-butyl acrylate-cyclohexyl methacrylate random copolymer emulsion, solid content concentration: 36% by mass, glass transition temperature: −10° C., no hydrazine compound content
(d-1-9) Resin: NK Polymer EC-310 (manufactured by Shin-Nakamura Chemical Co., Ltd.), methyl methacrylate-butyl acrylate-cyclohexyl methacrylate random copolymer emulsion, solid content concentration: 36% by mass, glass transition temperature: 10° C., 3 parts by mass of 4 carbon chain hydrazine compound content with respect to 100 parts by mass of acrylic resin
(d-1-10) Resin: NK Polymer EC-311 (manufactured by Shin-Nakamura Chemical Co., Ltd.), methyl methacrylate-butyl acrylate-cyclohexyl methacrylate random copolymer emulsion, solid content concentration: 36% by mass, glass transition temperature: −20° C., 3 parts by mass of 4 carbon chain hydrazine compound content with respect to 100 parts by mass of acrylic resin
(d-1-11) Resin: NK Polymer EC-312 (manufactured by Shin-Nakamura Chemical Co., Ltd.), methyl methacrylate-butyl acrylate-cyclohexyl methacrylate random copolymer emulsion, solid content concentration: 36% by mass, glass transition temperature: 60° C., 3 parts by mass of 4 carbon chain hydrazine compound content with respect to 100 parts by mass of acrylic resin
(d-1-12) Resin: NK Polymer EC-24 (manufactured by Shin-Nakamura Chemical Co., Ltd.), methyl methacrylate-butyl acrylate-cyclohexyl methacrylate random copolymer emulsion, solid content concentration: 36% by mass, glass transition temperature: 80° C., no hydrazine compound content
(d-1-13) Resin: NK Polymer EC-2424 (manufactured by Shin-Nakamura Chemical Co., Ltd.), methyl methacrylate-butyl acrylate-cyclohexyl methacrylate random copolymer emulsion, solid content concentration: 36% by mass, glass transition temperature: 40° C., no hydrazine compound content
((D) Electrically Conductive Agent Added to Heat Seal Layer)
(d-2-1) Electrically Conductive Agent: SN-100D (manufactured by ISHIHARA SANGYOU KAISHA, LTD.), spheroidal antimony-doped tin oxide, number average long diameter: 0.1 μm, aqueous dispersion type, solid content concentration: 30% by mass
(d-2-2) Electrically Conductive Agent: FS-10D (manufactured by ISHIHARA SANGYOU KAISHA, LTD.), needle-shaped antimony-doped tin oxide, number average length: 2 μm, aqueous dispersion type, solid content concentration: 20% by mass
(d-2-3) Electrically Conductive Agent: DCNT240D-1 (manufactured by DAIDO CORPORATION), carbon nanotubes, solid content concentration: 1 wt. %
((D) Inorganic Filler Added to Heat Seal Layer)
(d-3-1) Inorganic Filler: W630 (manufactured by Evonik Japan Co., Ltd.) spheroidal alumina, number average long diameter: 0.1 μm, aqueous dispersion type, solid content concentration: 30% by mass Example 1

As a resin constituting the (C) adhesive layer, a resin composition constituting an adhesive layer was obtained by pre-blending 80% by mass of a hydrogenated resin of a styrene-butadiene-styrene triblock copolymer ("Tuftec H1041" manufactured by Asahi Kasei Chemicals Corporation, styrene component content: 30% by mass) and 20% by mass of a talc and silica masterbatch ("PEX-ABT-16" manufactured by TOKYO PRINTING INK MFG. CO., LTD.) in a tumbler and kneading at 200° C. using a 40 mm diameter single-screw extruder and extruding at a line rate of 20 m per minute. This resin composition and, as an olefin-based resin constituting the (B) intermediate layer, a metallocene linear low-density polyethylene ("Umerit 2040F" manufactured by UBE-MARUZEN POLYETHYLENE) were extruded from separate single-screw extruders and, by laminate-extruding with a multi-manifold T-die, a two-layer film in which the thickness of the (C) adhesive layer is 10 μm and the thickness of the (B) intermediate layer is 20 μm was obtained. Next, an anchor coat layer was formed on one surface of a biaxially stretched polyethylene terephthalate film that is the (A) substrate layer (thickness: 16 μm, "E-5100" manufactured by TOYOBO CO., LTD.) with a gravure method such that the post-drying thickness becomes 3 μm using a two liquid curing-type adhesive comprising a polyester-based resin ("LIOSTAR 1000" manufactured by Toyo-Morton, Ltd.) as a main agent and a hexamethylene diisocyanate/isophorone diisocyanate ("LIOSTAR 500H" manufactured by Toyo-Morton, Ltd.) as a curing agent and this was pasted to the (B) intermediate layer surface of the two-layer film with a dry lamination method. A cover film for an electronic component carrier tape with the configuration shown in FIG. 1 was obtained by, after a corona treatment was performed on the (C) adhesive layer, applying a solution comprising 5% by mass of a methyl methacrylate-butyl acrylate-cyclohexyl methacrylate random copolymer in which a hydrazide compound is mixed [(d-1-2) resin emulsion], 15% by mass of a methyl methacrylate-butyl acrylate-cyclohexyl methacrylate random copolymer [(d-1-1) resin emulsion], and 80% by mass of an electrically conductive agent [(d-2-1) electrically conductive filler dispersion] so as to have a post-drying thickness of 0.3 μm to form the (D) heat seal layer (the anchor coat layer is not illustrated).

Examples 2 to 19 and Comparative Examples 1 to 4

Cover films were created in the same manner as Example 1 other than the (C) adhesive layer and the (D) heat seal layer being formed using the raw materials such as resins described in Tables 1 to 3.

Comparative Example 5

A cover film was created in the same manner as Example 1 other than the (D) heat seal layer being formed without providing the (C) adhesive layer and the thickness of the (B) intermediate layer being set to 30 μm.

Comparative Example 6

A cover film was created in the same manner as Example 1 other than the (B) intermediate layer not being provided and the (C) adhesive layer being formed using the raw materials described in Table 2 and the thickness thereof being set to 30 μm.

Evaluation Method
The cover films for an electronic component carrier tape fabricated in the examples and comparative examples were evaluated as shown below. The results thereof are collectively shown in Tables 1 to 3.
(1) Haze Value
The haze value was measured using an integrating sphere-type measurement device in accordance with Measurement Method A of JIS K 7105:1998. The results are shown in the haze value row in Tables 1 to 3.
(2) Sealing
Using a taping machine (ETM-480 manufactured by SHIBUYA CORPORATION), a 5.5 mm width cover film was heat sealed to an 8 mm width polycarbonate carrier tape (manufactured by Denka Company Limited) and a polystyrene carrier tape (manufactured by Denka Company Limited) with a seal head width of 0.5 mm×2, a seal head length of 32 mm, a seal pressure of 0.1 MPa, a feed length of 4 mm, a seal period of 0.1 seconds×8 times at a seal iron temperature of 10° C. intervals from 140 to 190° C. After being left for 24 hours in an atmosphere with a temperature of 23° C. and a relative humidity of 50%, the cover films were peeled at a rate of 300 mm per minute and a peeling angle of 170 to 180° in the same atmosphere with a temperature of 23° C. and a relative humidity of 50% and those having an average peeling strength in the range of 0.3 to 0.9 N when heat sealed with a seal iron temperature at 10° C. intervals from 140 to 190° C. are marked as "excellent", those having an average peeling strength that falls outside the range of 0.3 to 0.9 N when heat sealed with a seal iron temperature at 10° C. intervals from 140 to 190° C. although the seal iron temperature range is that in which the average peeling strength becomes 0.3 to 0.9 N are marked as "good", and those in which the average peeling strength is not in the region of 0.3 to 0.9 N at any seal iron temperature are marked as "poor". The results are shown in the sealing row in Tables 1 to 3.

(3) Variation in Peeling Strength

Heat sealing was performed so that the peeling strength with respect to the polystyrene carrier tape (manufactured by Denka Company Limited) becomes 0.4 N. The cover films were peeled under the same conditions as in (2) Sealing. The variance in peeling strength was derived from a chart obtained when a 100 mm portion of a cover film was peeled in the peeling direction. Those in which the variation of the peeling strength was no greater than 0.2 N were described as "excellent", those in which the variation was from 0.2 to 0.4 N were described as "good", and those in which the variation was greater than 0.4 N were described as "poor". The results are shown in the Variation in Peeling Strength row in Tables 1 to 3.

(4) Friction with Electronic Component Testing

After an electronic component (SOT-223-6 manufactured by Texas Instruments Inc., 6.45 mm×3.45 mm×1.80 mm) was loaded in a polycarbonate carrier tape (manufactured by Denka Company Limited) in an atmosphere with a temperature of 23° C. and a relative humidity of 50%, a cover tape was heat sealed at 190° C. and a 20 cm tape cut sample was produced. A vibration tester (environmental vibration tester CV-101) was fixed to one side of the tape cut sample and friction vibration testing with the electronic component performed with a frequency of 20 Hz, an acceleration of 1.5 G, an amplitude of 2 mm, and a time period of 1 minute. Those in which there was no damage to the heat seal surface of the cover tape were marked as "excellent", those in which there was damage to one location within the four corners of the electronic component were marked as "good", and those with damage at two or more locations were marked as "poor". The results are shown in the friction test row in Tables 1 to 3.

(5) Temporal Stability of Peeling Strength

Heat sealing was performed under the same conditions as in (2) Sealing such that the peeling strength becomes 0.4 N. Measurement of the peeling strength was performed after placing the cover tapes in an environment with a temperature of 60° C. and a relative humidity of 10% and an environment with a temperature of 60° C. and a relative humidity of 90% for seven days and then, after removing the cover tapes, leaving them for 24 hours in an atmosphere with a temperature of 23° C. and a relative humidity of 50% in the same atmosphere with a temperature of 23° C. and a relative humidity of 50%. The measurements of peeling strength were performed under the same conditions as in (2) Sealing. Those in which the average peeling strength was in the range of 0.4±0.1 N were marked as "excellent", those in which the average peeling strength was in the range of 0.4±0.2 N were marked as "good", and those with an average peeling strength outside this range were marked as "poor". The results are shown in the peeling strength row in Tables 1 to 3.

(6) Surface Resistivity

The surface resistivity of the heat seal layer surface was measured with the method of JIS K 6911 using a Hiresta UP MCP-HT450 manufactured by Mitsubishi Chemical Corporation at an atmospheric temperature of 23° C., an atmospheric humidity of 50% RH, and with an applied voltage of 10 V. The results are shown in the surface resistivity row in Tables 1 to 3.

TABLE 1

| | | Layer Configuration | | Example 1 | Example 2 | Example 3 | Example 4 | Example 5 |
|---|---|---|---|---|---|---|---|---|
| Substrate Layer | o-PET | a-1 | E-5100 | 100 | 100 | 100 | 100 | 100 |
| Intermediate Layer | m-LLDPE | b-1 | 2040F | 100 | 100 | 100 | 100 | 100 |
| Adhesive Layer Blend | Resin | c-1-1 | Tuftec H1041 | Styrene-butadiene-styrene triblock copolymer hydrogenated resin | 80 | 80 | 80 | 80 | 80 |
| | Resin | c-1-2 | Denka Clearen | Styrene-butadiene block copolymer | | | | | |
| | Resin | c-1-3 | TR Resin | Styrene-butadiene block copolymer | | | | | |
| | Resin | c-1-4 | Tafmer A | Ethylene-1-butene random copolymer | | | | | |
| | Resin | c-1-5 | Toyo Styrol E640N | High-impact polystyrene | | | | | |
| | Resin | c-1-6 | Everflex V5711 | Ethylene-vinyl acetate copolymer | | | | | |
| | Microparticles | c-2 | PEX-ABT-16 | Talc and silica masterbatch | 20 | 20 | 20 | 20 | 20 |
| Heat Seal Layer Blend | Resin | d-1-1 | NK Polymer EC-242 | Acrylic copolymer emulsion, Tg 60° C., no hydrazide compound content | 15 | 15 | 15 | 15 | 15 |
| | Resin | d-1-2 | NK Polymer EC-300 | Acrylic copolymer emulsion, Tg 0° C., 3 parts by weight C4 hydrazide compound content | 5 | | | | |
| | Resin | d-1-3 | NK Polymer EC-301 | Acrylic copolymer emulsion, Tg −10° C., 1 part by weight C4 hydrazide compound content | | 5 | | | |
| | Resin | d-1-4 | NK Polymer EC-302 | Acrylic copolymer emulsion, Tg −10° C., 3 parts by weight C4 hydrazide compound content | | | 5 | | |
| | Resin | d-1-5 | NK Polymer EC-303 | Acrylic copolymer emulsion, Tg −10° C., 5 parts by weight C4 hydrazide compound content | | | | 5 | |
| | Resin | d-1-6 | NK Polymer EC-306 | Acrylic copolymer emulsion, Tg −10° C., 3 parts by weight C8 hydrazide compound content | | | | | 5 |
| | Resin | d-1-7 | NK Polymer EC-307 | Acrylic copolymer emulsion, Tg −10° C., 3 parts by weight C1 hydrazide compound content | | | | | |
| | Resin | d-1-8 | NK Polymer EC-302NC | Acrylic copolymer emulsion, Tg −10° C., no hydrazide compound content | | | | | |

TABLE 1-continued

| | | | | Example 6 | Example 7 | Example 8 | Example 9 |
|---|---|---|---|---|---|---|---|
| Resin | d-1-9 | NK Polymer EC-310 | Acrylic copolymer emulsion, Tg 10° C., 3 parts by weight C4 hydrazide compound content | | | | |
| Resin | d-1-10 | NK Polymer EC-311 | Acrylic copolymer emulsion, Tg −20° C., 3 parts by weight C4 hydrazide compound content | | | | |
| Resin | d-1-11 | NK Polymer EC-312 | Acrylic copolymer emulsion, Tg 60° C., 3 parts by weight C4 hydrazide compound content | | | | |
| Resin | d-1-12 | NK Polymer EC-24 | Acrylic copolymer emulsion, Tg 80° C., no hydrazide compound content | | | | |
| Resin | d-1-13 | NK Polymer EC-2424 | Acrylic copolymer emulsion, Tg 40° C., no hydrazide compound content | | | | |
| Resin Mixing Ratio | | | Low Tg acrylic copolymer:high Tg acrylic copolymer:hydrazide compound | 100:309:3 | 100:303:1 | 100:309:3 | 100:309:3 |
| | | | | 100:315:5 | | | |
| | | | | 100:309:3 | | | |
| Electrically Conductive Agent | d-2-1 | SN-100D | Spheroidal antimony-doped tin oxide dispersion | 80 | 80 | 80 | 80 |
| Electrically Conductive Agent | d-2-2 | FS-10D | Needle-shaped antimony-doped tin oxide dispersion | | | | |
| Electrically Conductive Agent | d-2-3 | DCNT-240D-1 | Carbon nanotube dispersion | | | | |
| Inorganic Filler | d-3-1 | W630 | Spheroidal alumina dispersion | | | | |
| Evaluated Physical Properties, etc. | Substrate Layer Thickness, μm | | | 16 | 16 | 16 | 16 |
| | Anchor Coat Layer Thickness, μm | | | 3 | 3 | 3 | 3 |
| | Intermediate Layer Thickness, μm | | | 20 | 20 | 20 | 20 |
| | Adhesive Layer Thickness, μm | | | 10 | 10 | 10 | 10 |
| | Heat Seal Layer Thickness, μm | | | 0.3 | 0.3 | 0.3 | 0.3 |
| | Cover Film Thickness, μm | | | 49.3 | 49.3 | 49.3 | 49.3 |
| | (1) Haze Value, % | | | 17 | 17 | 17 | 17 |
| | (2) Sealing | 1 | To polycarbonate carrier tape | Excellent | Excellent | Excellent | Excellent |
| | | 2 | To polystyrene carrier tape | Excellent | Excellent | Excellent | Excellent |
| | (3) Variation in Peeling Strength | | | Excellent | Excellent | Good | Excellent |
| | (4) Friction with Electronic Component Testing | | | Excellent | Excellent | Excellent | Good |
| | (5) Temporal Stability of Peeling Strength | | | Excellent | Excellent | Excellent | Excellent |
| | (6) Surface Resistivity, Ω | | | 5.2.E+08 | 4.9.E+08 | 6.0.E+08 | 4.5.E+08 |
| | | | | | | | 3.8.E+08 |
| Substrate Layer | o-PET | a-1 | E-5100 | | 100 | 100 | 100 |
| Intermediate Layer | m-LLDPE | b-1 | 2040F | 100 | 100 | 100 | 100 |

TABLE 1-continued

| | | | | Description | Col1 | Col2 | Col3 | Col4 |
|---|---|---|---|---|---|---|---|---|
| Adhesive Layer Blend | Resin | c-1-1 | Tuftec H1041 | Styrene-butadiene-styrene triblock copolymer hydrogenated resin | 80 | 80 | 80 | 80 |
| | Resin | c-1-2 | Denka Clearen | Styrene-butadiene block copolymer | | | | |
| | Resin | c-1-3 | TR Resin | Styrene-butadiene block copolymer | | | | |
| | Resin | c-1-4 | Tafmer A | Ethylene-1-butene random copolymer | | | | |
| | Resin | c-1-5 | Toyo Styrol E640N | High-impact polystyrene | | | | |
| | Resin | c-1-6 | Everflex V5711 | Ethylene-vinyl acetate copolymer | | | | |
| | Microparticles | c-2 | PEX-ABT-16 | Talc and silica masterbatch | 20 | 20 | 20 | 20 |
| Heat Seal Layer Blend | Resin | d-1-1 | NK Polymer EC-242 | Acrylic copolymer emulsion, Tg 60° C., no hydrazide compound content | 15 | | | |
| | Resin | d-1-2 | NK Polymer EC-300 | Acrylic copolymer emulsion, Tg 0° C., 3 parts by weight C4 hydrazide compound content | | | | |
| | Resin | d-1-3 | NK Polymer EC-301 | Acrylic copolymer emulsion, Tg −10° C., 1 part by weight C4 hydrazide compound content | | | | |
| | Resin | d-1-4 | NK Polymer EC-302 | Acrylic copolymer emulsion, Tg −10° C., 3 parts by weight C4 hydrazide compound content | | | | |
| | Resin | d-1-5 | NK Polymer EC-303 | Acrylic copolymer emulsion, Tg −10° C., 5 parts by weight C4 hydrazide compound content | | | | |
| | Resin | d-1-6 | NK Polymer EC-306 | Acrylic copolymer emulsion, Tg −10° C., 3 parts by weight C8 hydrazide compound content | 5 | | | |
| | Resin | d-1-7 | NK Polymer EC-307 | Acrylic copolymer emulsion, Tg −10° C., 3 parts by weight C1 hydrazide compound content | | 5 | 5 | |
| | Resin | d-1-8 | NK Polymer EC-302NC | Acrylic copolymer emulsion, Tg −10° C., no hydrazide compound content | | | | |
| | Resin | d-1-9 | NK Polymer EC-310 | Acrylic copolymer emulsion, Tg 10° C., 3 parts by weight C4 hydrazide compound content | | | | 5 |
| | Resin | d-1-10 | NK Polymer EC-311 | Acrylic copolymer emulsion, Tg −20° C., 3 parts by weight C4 hydrazide compound content | | | | |
| | Resin | d-1-11 | NK Polymer EC-312 | Acrylic copolymer emulsion, Tg 60° C., 3 parts by weight C4 hydrazide compound content | | | | |
| | Resin | d-1-12 | NK Polymer EC-24 | Acrylic copolymer emulsion, Tg 80° C., no hydrazide compound content | | 15 | | |
| | Resin | d-1-13 | NK Polymer EC-2424 | Acrylic copolymer emulsion, Tg 40° C., no hydrazide compound content | | | 15 | 15 |
| Resin Mixing Ratio | | | | Low Tg acrylic copolymer:high Tg acrylic copolymer:hydrazide compound | 100:309:3 | 100:309:3 | 100:309:3 | 100:309:3 |

TABLE 1-continued

| | | | | | | | | |
|---|---|---|---|---|---|---|---|---|
| | Electrically Conductive Agent | d-2-1 | SN-100D | Spheroidal antimony-doped tin oxide dispersion | 80 | 80 | 80 | 80 |
| | Electrically Conductive Agent | d-2-2 | FS-10D | Needle-shaped antimony-doped tin oxide dispersion | | | | |
| | Electrically Conductive Agent | d-2-3 | DCNT-240D-1 | Carbon nanotube dispersion | | | | |
| | Inorganic Filler | d-3-1 | W630 | Spheroidal alumina dispersion | | | | |
| Evaluated Physical Properties, etc. | Substrate Layer Thickness, μm | | | | 16 | 16 | 16 | 16 |
| | Anchor Coat Layer Thickness, μm | | | | 3 | 3 | 3 | 3 |
| | Intermediate Layer Thickness, μm | | | | 20 | 20 | 20 | 20 |
| | Adhesive Layer Thickness, μm | | | | 10 | 10 | 10 | 10 |
| | Heat Seal Layer Thickness, μm | | | | 0.3 | 0.3 | 0.3 | 0.3 |
| | Cover Film Thickness, μm | | | | 49.3 | 49.3 | 49.3 | 49.3 |
| | (1) Haze Value, % | | | | 17 | 19 | 16 | 16 |
| | (2) Sealing | 1 | | To polycarbonate carrier tape | Excellent | Good | Excellent | Excellent |
| | | 2 | | To polystyrene carrier tape | Excellent | Good | Excellent | Excellent |
| | (3) Variation in Peeling Strength | | | | Excellent | Excellent | Excellent | Excellent |
| | (4) Friction with Electronic Component Testing | | | | Excellent | Good | Good | Good |
| | (5) Temporal Stability of Peeling Strength | | | | Excellent | Excellent | Excellent | Excellent |
| | (6) Surface Resistivity, Ω | | | | 6.0E+08 | 5.1E+08 | 5.7E+08 | 6.5E+08 |

TABLE 2

| | Layer Configuration | | | | Example 10 | Example 11 | Example 12 | Example 13 | Example 14 |
|---|---|---|---|---|---|---|---|---|---|
| Substrate Layer | o-PET | a-1 | E-5100 | | 100 | 100 | 100 | 100 | 100 |
| Intermediate Layer | m-LLDPE | b-1 | 2040F | | 100 | 100 | 100 | 100 | 100 |
| Adhesive Layer Blend | Resin | c-1-1 | Tuftec H1041 | Styrene-butadiene-styrene triblock copolymer hydrogenated resin | 80 | 80 | 80 | 80 | 80 |
| | Resin | c-1-2 | Denka Clearen | Styrene-butadiene block copolymer | | | | | |
| | Resin | c-1-3 | TR Resin | Styrene-butadiene block copolymer | | | | | |
| | Resin | c-1-4 | Tafmer A | Ethylene-1-butene random copolymer | | | | | |
| | Resin | c-1-5 | Toyo Styrol E640N | High-impact polystyrene | | | | | |
| | Resin | c-1-6 | Everflex V5711 | Ethylene-vinyl acetate copolymer | | | | | |
| | Microparticles | c-2 | PEX-ABT-16 | Talc and silica masterbatch | 20 | 20 | 20 | 20 | 20 |
| Heat Seal Layer Blend | Resin | d-1-1 | NK Polymer EC-242 | Acrylic copolymer emulsion, Tg 60° C., no hydrazide compound content | | 10 | 15.8 | 30 | 39 |
| | Resin | d-1-2 | NK Polymer EC-300 | Acrylic copolymer emulsion, Tg 0° C., 3 parts by weight C4 hydrazide compound content | | 10 | 4.2 | | |
| | Resin | d-1-3 | NK Polymer EC-301 | Acrylic copolymer emulsion, Tg −10° C., 1 part by weight C4 hydrazide compound content | | | | | |
| | Resin | d-1-4 | NK Polymer EC-302 | Acrylic copolymer emulsion, Tg −10° C., 3 parts by weight C4 hydrazide compound content | | | | | |
| | Resin | d-1-5 | NK Polymer EC-303 | Acrylic copolymer emulsion, Tg −10° C., 5 parts by weight C4 hydrazide compound content | | | | | |
| | Resin | d-1-6 | NK Polymer EC-306 | Acrylic copolymer emulsion, Tg −10° C., 3 parts by weight C8 hydrazide compound content | | | | | |
| | Resin | d-1-7 | NK Polymer EC-307 | Acrylic copolymer emulsion, Tg −10° C., 3 parts by weight C1 hydrazide compound content | | | | 10 | 13 |
| | Resin | d-1-8 | NK Polymer EC-302NC | Acrylic copolymer emulsion, Tg −10° C., no hydrazide compound content | | | | | |
| | Resin | d-1-9 | NK Polymer EC-310 | Acrylic copolymer emulsion, Tg 10° C., 3 parts by weight C4 hydrazide compound content | | | | | |
| | Resin | d-1-10 | NK Polymer EC-311 | Acrylic copolymer emulsion, Tg −20° C., 3 parts by weight C4 hydrazide compound content | 5 | | | | |
| | Resin | d-1-11 | NK Polymer EC-312 | Acrylic copolymer emulsion, Tg 60° C., 3 parts by weight C4 hydrazide compound content | | | | | |
| | Resin | d-1-12 | NK Polymer EC-24 | Acrylic copolymer emulsion, Tg 80° C., no hydrazide compound content | | | | | |
| | Resin | d-1-13 | NK Polymer EC-2424 | Acrylic copolymer emulsion, Tg 40° C., no hydrazide compound content | 15 | | | | |
| | Resin Mixing Ratio | | | Low Tg acrylic copolymer:high Tg acrylic copolymer:hydrazide compound | 100:309:3 | 100:103:3 | 100:387:3 | 100:309:3 | 100:309:3 |
| | Electrically Conductive Agent | d-2-1 | SN-100D | Spheroidal antimony-doped tin oxide dispersion | 80 | 80 | 80 | | |
| | Electrically Conductive Agent | d-2-2 | FS-10D | Needle-shaped antimony-doped tin oxide dispersion | | | | 60 | |

TABLE 2-continued

|  |  |  |  |  |  |  |  |  |  |
|---|---|---|---|---|---|---|---|---|---|
|  | Electrically Conductive Agent | d-2-3 | DCNT-240D-1 | Carbon nanotube dispersion |  |  |  |  | 3 |
|  | Inorganic Filler | d-3-1 | W630 | Spheroidal alumina dispersion |  |  |  |  | 45 |
| Evaluated Physical Properties, etc. | Substrate Layer Thickess, μm |  |  |  | 16 | 16 | 16 | 16 | 16 |
|  | Anchor Coat Layer Thickness, μm |  |  |  | 3 | 3 | 3 | 3 | 3 |
|  | Intermediate Layer Thickness, μm |  |  |  | 20 | 20 | 20 | 20 | 20 |
|  | Adhesive Layer Thickness, μm |  |  |  | 10 | 10 | 10 | 10 | 10 |
|  | Heat Seal Layer Thickness, μm |  |  |  | 0.3 | 0.3 | 0.3 | 0.3 | 0.3 |
|  | Cover Film Thickness, μm |  |  |  | 49.3 | 49.3 | 49.3 | 49.3 | 49.3 |
|  | (1) Haze Value, % |  |  |  | 20 | 17 | 17 | 16 | 20 |
|  | (2) Sealing | 1 |  | To polycarbonate carrier tape | Excellent | Excellent | Excellent | Excellent | Excellent |
|  |  | 2 |  | To polystyrene carrier tape | Excellent | Excellent | Excellent | Excellent | Excellent |
|  | (3) Variation in Peeling Strength |  |  |  | Good | Excellent | Excellent | Excellent | Excellent |
|  | (4) Friction with Electronic Component Testing |  |  |  | Good | Good | Good | Excellent | Excellent |
|  | (5) Temporal Stability of Peeling Strength |  |  |  | Good | Excellent | Excellent | Excellent | Excellent |
|  | (6) Surface Resistivity, Ω |  |  |  | 4.1.E+08 | 3.2.E+08 | 2.6.E+08 | 3.3.E+08 | 7.8.E+08 |

|  | Layer Configuration |  |  |  | Example 15 | Example 16 | Example 17 | Example 18 | Example 19 |
|---|---|---|---|---|---|---|---|---|---|
| Substrate Layer | o-PET | a-1 | E-5100 |  | 100 | 100 | 100 | 100 | 100 |
| Intermediate Layer | m-LLDPE | b-1 | 2040F |  | 100 | 100 | 100 | 100 | 100 |
| Adhesive Layer Blend | Resin | c-1-1 | Tuftec H1041 | Styrene-butadiene-styrene triblock copolymer hydrogenated resin | 80 |  |  | 80 | 80 |
|  | Resin | c-1-2 | Denka Clearen | Styrene-butadiene block copolymer |  | 42.5 |  |  |  |
|  | Resin | c-1-3 | TR Resin | Styrene-butadiene block copolymer |  | 12.5 |  |  |  |
|  | Resin | c-1-4 | Tafmer A | Ethylene-1-butene random copolymer |  | 35 |  |  |  |
|  | Resin | c-1-5 | Toyc Styrol E640N | High-impact polystyrene |  | 10 |  |  |  |
|  | Resin | c-1-6 | Everflex V5711 | Ethylene-vinyl acetate copolymer |  |  | 80 |  |  |
|  | Microparticles | c-2 | PEX-ABT-16 | Talc and silica masterbatch | 20 |  | 20 | 20 | 20 |
| Heat Seal Layer Blend | Resin | d-1-1 | NK Polymer EC-242 | Acrylic copolymer emulsion, Tg 60° C., no hydrazide compound content |  | 15 | 15 |  | 5 |
|  | Resin | d-1-2 | NK Polymer EC-300 | Acrylic copolymer emulsion, Tg 0° C., 3 parts by weight C4 hydrazide compound content |  |  |  |  |  |
|  | Resin | d-1-3 | NK Polymer EC-301 | Acrylic copolymer emulsion, Tg −10° C., 1 part by weight C4 hydrazide compound content |  |  |  |  |  |
|  | Resin | d-1-4 | NK Polymer EC-302 | Acrylic copolymer emulsion, Tg −10° C., 3 parts by weight C4 hydrazide compound content |  |  |  |  |  |
|  | Resin | d-1-5 | NK Polymer EC-303 | Acrylic copolymer emulsion, Tg −10° C., 5 parts by weight C4 hydrazide compound content |  |  |  |  |  |
|  | Resin | d-1-6 | NK Polymer EC-306 | Acrylic copolymer emulsion, Tg −10° C., 3 parts by weight C8 hydrazide compound content |  |  |  |  |  |
|  | Resin | d-1-7 | NK Polymer EC-307 | Acrylic copolymer emulsion, Tg −10° C., 3 parts by weight C1 hydrazide compound content | 25 | 5 | 5 |  |  |
|  | Resin | d-1-8 | NK Polymer EC-302NC | Acrylic copolymer emulsion, Tg −10° C., no hydrazide compound content |  |  |  | 5 |  |
|  | Resin | d-1-9 | NK Polymer EC-310 | Acrylic copolymer emulsion, Tg 10° C., 3 parts by weight C4 hydrazide compound content |  |  |  |  |  |
|  | Resin | d-1-10 | NK Polymer EC-311 | Acrylic copolymer emulsion, Tg −20° C., 3 parts by weight C4 hydrazide compound content |  |  |  |  |  |

TABLE 2-continued

| | | | | | | | | | | |
|---|---|---|---|---|---|---|---|---|---|---|
| | Resin | d-1-11 | NK Polymer EC-312 | Acrylic copolymer emulsion, Tg 60° C., 3 parts by weight C4 hydrazide compound content | | | | | 15 | 15 |
| | Resin | d-1-12 | NK Polymer EC-24 | Acrylic copolymer emulsion, Tg 80° C., no hydrazide compound content | | | | | | |
| | Resin | d-1-13 | NK Polymer EC-2424 | Acrylic copolymer emulsion, Tg 40° C., no hydrazide compound content | 75 | | | | | |
| | Resin Mixing Ratio | | | Low Tg acrylic copolymer:high Tg acrylic copolymer:hydrazide compound | | 100:309:3 | 100:309:3 | 100:309:3 | 100:291:3 | 100:291:3 |
| | Electrically Conductive Agent | d-2-1 | SN-100D | Spheroidal antimony-doped tin oxide dispersion | | 80 | 80 | 80 | 80 | |
| | Electrically Conductive Agent | d-2-2 | FS-10D | Needle-shaped antimony-doped tin oxide dispersion | | | | | | |
| | Electrically Conductive Agent | d-2-3 | DCNT-240D-1 | Carbon nanotube dispersion | | | | | | |
| | Inorganic Filler | d-3-1 | W630 | Spheroidal alumina dispersion | | | | | | |
| Evaluated Physical Properties, etc. | Substrate Layer Thickness, μm | | | | 16 | 16 | 16 | 16 | 16 | |
| | Anchor Coat Layer Thickness, μm | | | | 3 | 3 | 3 | 3 | 3 | |
| | Intermediate Layer Thickness, μm | | | | 20 | 20 | 20 | 20 | 20 | |
| | Adhesive Layer Thickness, μm | | | | 10 | 10 | 10 | 10 | 10 | |
| | Heat Seal Layer Thickness, μm | | | | 0.3 | 0.3 | 0.3 | 0.3 | 0.3 | |
| | Cover Film Thickness, μm | | | | 49.3 | 49.3 | 49.3 | 49.3 | 49.3 | |
| | (1) Haze Value, % | | | | 15 | 19 | 17 | 17 | 17 | |
| | (2) Sealing | 1 | | To polycarbonate carrier tape | Excellent | Excellent | Excellent | Excellent | Excellent | |
| | | 2 | | To polystyrene carrier tape | Excellent | Excellent | Excellent | Good | Good | |
| | (3) Variation in Peeling Strength | | | | Excellent | Excellent | Excellent | Good | Good | |
| | (4) Friction with Electronic Component Testing | | | | Good | Excellent | Excellent | Excellent | Excellent | |
| | (5) Temporal Stability of Peeling Strength | | | | Excellent | Excellent | Excellent | Good | Good | |
| | (6) Surface Resistivity, Ω | | | | >1.0E+14 | 5.9.E+08 | 5.5.E+08 | 3.2.E+08 | 2.4.E+08 | |

TABLE 3

| | | Layer Configuration | | | Comparative Example 1 | Comparative Example 2 | Comparative Example 3 | Comparative Example 4 | Comparative Example 5 | Comparative Example 6 |
|---|---|---|---|---|---|---|---|---|---|---|
| Substrate Layer | o-PET | a-1 | E-5100 | | 100 | 100 | 100 | 100 | 100 | 100 |
| Intermediate Layer | m-LLDPE | b-1 | 2040F | | 100 | 100 | 100 | 100 | 100 | |
| Adhesive Layer Blend | Resin | c-1-1 | Tuftec H1041 | Styrene-butadiene-styrene triblock copolymer hydrogenated resin | 80 | 80 | 80 | 80 | | |
| | Resin | c-1-2 | Denka Clearen | Styrene-butadiene block copolymer | | | | | | 42.5 |
| | Resin | c-1-3 | TR Resin | Styrene-butadiene block copolymer | | | | | | 12.5 |
| | Resin | c-1-4 | Tafmer A | Ethylene-1-butene random copolymer | | | | | | 35 |
| | Resin | c-1-5 | Toyc Styrol E640N | High-impact polystyrene | | | | | | 10 |
| | Resin | c-1-6 | Everflex V5711 | Ethylene-vinyl acetate copolymer | | | | | | |
| | Microparticles | c-2 | PEX-ABT-16 | Talc and silica masterbatch | 20 | 20 | 20 | 20 | | |
| Heat Seal Layer Blend | Resin | d-1-1 | NK Polymer EC-242 | Acrylic copolymer emulsion, Tg 60° C., no hydrazide compound content | 20 | | 15 | | 15 | 15 |
| | Resin | d-1-2 | NK Polymer EC-300 | Acrylic copolymer emulsion, Tg 0° C., 3 parts by weight C4 hydrazide compound content | | 20 | | | 5 | 5 |

TABLE 3-continued

| | Layer Configuration | | | Comparative Example 1 | Comparative Example 2 | Comparative Example 3 | Comparative Example 4 | Comparative Example 5 | Comparative Example 6 |
|---|---|---|---|---|---|---|---|---|---|
| | Resin | d-1-3 | NK Polymer EC-301 | Acrylic copolymer emulsion, Tg −10° C., 1 part by weight C4 hydrazide compound content | | | | | |
| | Resin | d-1-4 | NK Polymer EC-302 | Acrylic copolymer emulsion, Tg −10° C., 3 parts by weight C4 hydrazide compound content | | | | | |
| | Resin | d-1-5 | NK Polymer EC-303 | Acrylic copolymer emulsion, Tg −10° C., 5 parts by weight C4 hydrazide compound content | | | | | |
| | Resin | d-1-6 | NK Polymer EC-306 | Acrylic copolymer emulsion, Tg −10° C., 3 parts by weight C8 hydrazide compound content | | | | | |
| | Resin | d-1-7 | NK Polymer EC-307 | Acrylic copolymer emulsion, Tg −10° C., 3 parts by weight C1 hydrazide compound content | | | | | |
| | Resin | d-1-8 | NK Polymer EC-302NC | Acrylic copolymer emulsion, Tg −10° C., no hydrazide compound content | | | 5 | | | |
| | Resin | d-1-9 | NK Polymer EC-310 | Acrylic copolymer emulsion, Tg 10° C., 3 parts by weight C4 hydrazide compound content | | | | | | |
| | Resin | d-1-10 | NK Polymer EC-311 | Acrylic copolymer emulsion, Tg −20° C., 3 parts by weight C4 hydrazide compound content | | | | | | |
| | Resin | d-1-11 | NK Polymer EC-312 | Acrylic copolymer emulsion, Tg 60° C., 3 parts by weight C4 hydrazide compound content | | | | | 20 | |
| | Resin | d-1-12 | NK Polymer EC-24 | Acrylic copolymer emulsion, Tg 80° C., no hydrazide compound content | | | | | | |
| | Resin | d-1-13 | NK Polymer EC-2424 | Acrylic copolymer emulsion, Tg 40° C., no hydrazide compound content | | | | | | |
| | Resin Mixing Ratio | | | Low Tg acrylic copolymer:high Tg acrylic copolymer:hydrazide compound | | | 300:100:0 | | 100:309:3 | 100:309:3 |
| | Electrically Conductive Agent | d-2-1 | SN-100D | Spheroidal antimony-doped tin oxide dispersion | 80 | 80 | 80 | 80 | 80 | 80 |
| | Electrically Conductive Agent | d-2-2 | FS-10D | Needle-shaped antimony-doped tin oxide dispersion | | | | | | |
| | Electrically Conductive Agent | d-2-3 | DCNT-240D-1 | Carbon nanotube dispersion | | | | | | |
| | Inorganic Filler | d-3-1 | W630 | Spheroidal alumina dispersion | | | | | | |
| Evaluated Physical Properties, etc. | Substrate Layer Thickness, μm | | | | 16 | 16 | 16 | 16 | 16 | 16 |
| | Anchor Coat Layer Thickness, μm | | | | 3 | 3 | 3 | 3 | 3 | 3 |
| | Intermediate Layer Thickness, μm | | | | 20 | 20 | 20 | 20 | 30 | 0 |
| | Adhesive Layer Thickness, μm | | | | 10 | 10 | 10 | 10 | 0 | 30 |
| | Heat Seal Layer Thickness, μm | | | | 0.3 | 0.3 | 0.3 | 0.3 | 0.3 | 0.3 |
| | Cover Film Thickness, μm | | | | 49.3 | 49.3 | 49.3 | 49.3 | 49.3 | 49.3 |

TABLE 3-continued

| Layer Configuration | | Comparative Example 1 | Comparative Example 2 | Comparative Example 3 | Comparative Example 4 | Comparative Example 5 | Comparative Example 6 |
|---|---|---|---|---|---|---|---|
| (1) Haze Value, % | | 17 | 16 | 17 | 17 | 17 | 17 |
| (2) Sealing 1 | To polycarbonate carrier tape | Excellent | Excellent | Excellent | Excellent | Poor | Poor |
| 2 | To polystyrene carrier tape | Excellent | Excellent | Excellent | Excellent | Poor | Poor |
| (3) Variation in Peeling Strength | | Excellent | Excellent | Excellent | Excellent | Poor | Poor |
| (4) Friction with Electronic Component Testing | | Poor | Poor | Poor | Poor | Excellent | Excellent |
| (5) Temporal Stability of Peeling Strength | | Excellent | Poor | Excellent | Excellent | Poor | Poor |
| (6) Surface Resistivity, Ω | | 2.1.E+08 | 1.5.E+08 | 4.6.E+08 | 2.0.E+08 | 4.1.E+08 | 4.3.E+08 |

REFERENCE SIGNS LIST

1 Cover film
2 Substrate layer
3 Intermediate layer
4 Adhesive layer
5 Heat seal layer

The invention claimed is:

1. A cover film comprising at least (A) a substrate layer, (B) an intermediate layer, (C) an adhesive layer, and (D) a heat seal layer having a heat sealable resin, a thermoplastic resin constituting the (D) heat seal layer comprising a mixture of two types of (meth)acrylic acid ester copolymers with different glass transition temperatures and a hydrazide compound,
   wherein one of the (meth)acrylic acid ester copolymers in the (meth)acrylic acid ester copolymer mixture has a glass transition temperature of −20 to 10° C. and the other (meth)acrylic acid ester copolymer has a glass transition temperature of 40 to 80° C.
   the (meth)acrylic acid ester copolymer with the higher glass transition temperature is 100 to 400 parts by mass with respect to 100 parts by mass of the (meth)acrylic acid ester copolymer with the lower glass transition temperature.

2. The cover film according to claim 1, wherein one of the (meth)acrylic acid ester copolymer in the (meth)acrylic acid ester copolymer mixture has a glass transition temperature of −10 to 0° C. and the other (meth)acrylic acid ester copolymer has the glass transition temperature of 50 to 70° C.

3. The cover film according to claim 1, wherein the hydrazide compound is 1 to 3 parts by mass with respect to 100 parts by mass of the (meth)acrylic acid ester copolymer with the lower glass transition temperature.

4. The cover film according to claim 1, wherein the carbon chain in the hydrazide compound included in the (meth)acrylic acid ester copolymers that form the (D) heat seal layer is 1 to 4.

5. The cover film according to claim 1, wherein the (B) intermediate layer is formed from a polyolefin-based resin and,
   the (C) adhesive layer is formed from: a resin composition containing a styrene-based resin having a styrene-diene block copolymer as a main component and an ethylene-α-olefin random copolymer; a hydrogenate of an aromatic vinyl-conjugated diene copolymer comprising 15 to 35% by mass of a monomer unit derived from an aromatic vinyl compound; or an ethylene-vinyl acetate copolymer comprising 75 to 91% by mass of a monomer unit derived from ethylene.

6. The cover film according to claim 1, wherein the (D) heat seal layer contains an electrically conductive material and further,
   the shape of the electrically conductive material comprises either needle-shaped or spheroidal microparticles or a combination thereof.

7. The cover film according to claim 1, wherein the (C) adhesive layer or the (D) heat seal layer contains an electrically conductive material and further,
   the electrically conductive material is a carbon nanomaterial.

8. An electronic component package using the cover film according to claim 1 as a lid material of a carrier tape that comprises a thermoplastic resin.

* * * * *